US012525857B2

(12) United States Patent
Ono

(10) Patent No.: US 12,525,857 B2
(45) Date of Patent: Jan. 13, 2026

(54) LAMINATED IRON CORE, MANUFACTURING METHOD OF LAMINATED IRON CORE, AND PROGRESSIVE DIE MACHINE

(71) Applicant: MITSUI HIGH-TEC, INC., Fukuoka (JP)

(72) Inventor: Shinichiro Ono, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 206 days.

(21) Appl. No.: 18/105,458

(22) Filed: Feb. 3, 2023

(65) Prior Publication Data

US 2023/0291287 A1 Sep. 14, 2023

(30) Foreign Application Priority Data

Mar. 10, 2022 (JP) .................... 2022-037431

(51) Int. Cl.
*H02K 15/02* (2025.01)
*H02K 15/021* (2025.01)

(52) U.S. Cl.
CPC ....... *H02K 15/021* (2025.01); *H02K 2201/09* (2013.01); *H02K 2215/00* (2021.08)

(58) Field of Classification Search
CPC ............ H02K 15/024; H02K 2215/00; H02K 2201/09; H02K 15/02; B21D 21/00
USPC .................... 310/216.065, 216.004
See application file for complete search history.

(56) References Cited

U.S. PATENT DOCUMENTS

| 10,033,232 | B2 * | 7/2018 | Matsunaga | ........... B32B 15/043 |
| 10,201,844 | B2 * | 2/2019 | Nishinaka | ........... B21D 28/145 |
| 11,469,651 | B2 * | 10/2022 | Maruyama | ............ B21D 28/02 |
| 11,990,802 | B2 * | 5/2024 | Okudaira | ............... B21D 28/02 |
| 12,074,476 | B2 * | 8/2024 | Takeda | ................. H02K 15/024 |
| 2019/0259531 | A1 * | 8/2019 | Okudaria | ............... H02K 15/02 |
| 2019/0305654 | A1 * | 10/2019 | Matsubayashi | ......... H01F 41/02 |
| 2020/0108591 | A1 * | 4/2020 | Matsunaga | ......... B32B 38/1808 |
| 2021/0328484 | A1 * | 10/2021 | Backer | ................. B23K 26/082 |
| 2021/0343466 | A1 | 11/2021 | Honma et al. | |
| 2022/0014052 | A1 * | 1/2022 | Kamikawabata | ........ H02K 1/02 |
| 2022/0393558 | A1 | 12/2022 | Kurosaki | |

FOREIGN PATENT DOCUMENTS

| JP | 2005269732 | * | 9/2005 | ............ H02K 15/02 |
| JP | 5160862 | B2 | 12/2012 | |
| JP | 2018129981 | A | 8/2018 | |
| JP | 2021-72746 | | 5/2021 | |

(Continued)

*Primary Examiner* — Burton S Mullins
(74) *Attorney, Agent, or Firm* — Sterne, Kessler, Goldstein & Fox P.L.L.C.

(57) ABSTRACT

There are provided a laminated iron core, a manufacturing method thereof, and a progressive die machine, in which the laminated iron core includes: a plurality of iron core pieces which are laminated; adhesives that bond the iron core pieces adjacent to each other. Each of the iron core pieces includes an annular yoke portion and a plurality of teeth portions projecting radially from the yoke portion. Each of the adhesives is arranged at a different radial distance from a central axis of the iron core pieces and is evenly arranged in a circumferential direction of the iron core pieces on at least one of the entire yoke portion and the entire teeth portions.

10 Claims, 9 Drawing Sheets

(56) References Cited

FOREIGN PATENT DOCUMENTS

| WO | 2018/047209 | | 3/2018 |
|---|---|---|---|
| WO | 2021100637 | A1 | 5/2021 |
| WO | 2022038945 | A1 | 2/2022 |

\* cited by examiner

LAMINATED IRON CORE, MANUFACTURING METHOD OF LAMINATED IRON CORE, AND PROGRESSIVE DIE MACHINE

CROSS-REFERENCE TO RELATED APPLICATIONS

This application is based on and claims priority under 35 USC 119 from Japanese Patent Application No. 2022-037431 filed on Mar. 10, 2022, the contents of which are incorporated herein by reference.

TECHNICAL FIELD

The disclosed embodiments relate to a laminated iron core, a manufacturing method of a laminated iron core, and a progressive die machine.

BACKGROUND ART

A manufacturing apparatus of a laminated iron core, which laminates iron core pieces punched into a predetermined shape from band-shaped magnetic steel sheet by using a die, is well-known. In such a manufacturing apparatus, for example, a technique of punching an iron core piece after applying an adhesive to a predetermined position on a lower surface of a magnetic steel sheet is disclosed (see JP5160862B).

By the way, a magnetic steel sheet used for a laminated iron core is becoming thinner in response to a need for higher efficiency of a motor. Therefore, in order to prevent a portion of a magnetic steel sheet in the middle of punching from hanging down and interfering with a die during conveying, a configuration is well-known in which a lifter is used to support a lower surface of the magnetic steel sheet, and the magnetic steel sheet is conveyed while being lifted from the die.

However, when the magnetic steel sheet applied with an adhesive is lifted by the lifter, the adhesive applied to the lower surface of the magnetic steel sheet may adhere to the lifter.

SUMMARY OF INVENTION

The present disclosure provides a laminated iron core, a manufacturing method of the laminated iron core, and a progressive die machine which can prevent adhesion of an adhesive to a lifter.

According to an illustrative aspect of the present disclosure, a laminated iron core includes: a plurality of iron core pieces which are laminated; adhesives that bond the iron core pieces adjacent to each other. Each of the iron core pieces includes an annular yoke portion and a plurality of teeth portions projecting radially from the yoke portion. Each of the adhesives is arranged at a different radial distance from a central axis of the iron core pieces and is evenly arranged in a circumferential direction of the iron core pieces on at least one of the entire yoke portion and the entire teeth portions.

According to another illustrative aspect of the present disclosure, a manufacturing method of a laminated iron core includes: progressively feeding a metal plate in a predetermined direction while supporting a lower surface of the metal plate by a plurality of lifters; applying adhesives to an iron core piece region of the lower surface of the metal plate, the iron core piece region corresponding to each of iron core pieces including an annular yoke portion and a plurality of teeth portions projecting radially from the yoke portion; punching the iron core piece region to form each of the iron core pieces; and laminating the plurality of iron core pieces while adhering the iron core pieces adjacent to each other with the adhesives. In an operation of applying the adhesives, on at least one of the entire yoke portion and the entire teeth portions, each of the adhesives is arranged at a different radial distance from a central axis of the iron core pieces and is evenly arranged in a circumferential direction of the iron core pieces, and a region where the adhesives are not applied is disposed on each of the iron core pieces along the predetermined direction. In an operation of progressively feeding the metal plate, the lower surface of the metal plate is supported by the plurality of lifters to cause at least one of the lifters to pass through the region.

According to another illustrative aspect of the present disclosure, a progressive die machine includes: an upper die and a lower die configured to form each of iron core pieces including an annular yoke portion and a plurality of teeth portions protruding radially from the yoke portion by pressing a band-shaped metal plate fed progressively in a predetermined direction; a plurality of lifters provided on the lower die and configured to support a lower surface of the metal plate when the metal plate is fed progressively; and an applying unit provided in the lower die and configured to apply adhesives to the lower surface of the metal plate. The applying unit applies the adhesives on the lower surface of the metal plate such that on at least one of the entire yoke portion and the entire teeth portions, each of the adhesives is arranged at a different radial distance from a central axis of the iron core pieces and is evenly arranged in a circumferential direction of the iron core pieces, and a region where the adhesives are not applied is disposed on each of the iron core pieces along the predetermined direction. At least one of the lifters supports the lower surface of the metal plate to pass through the region.

According to the aspects of the present disclosure, the adhesion of the adhesive to the lifter can be prevented.

DESCRIPTION OF EMBODIMENTS

Hereinafter, a laminated iron core, a manufacturing method of a laminated iron core, and a progressive die machine disclosed in the present application will be described with reference to the accompanying drawings. It should be noted that the present disclosure is not limited by the embodiments shown below.

It should be noted that the drawings are schematic, and a dimensional relationship of elements, ratios of the elements, and the like may differ from reality. Furthermore, even between the drawings, there are cases where portions having different dimensional relationships and ratios are included.

<Laminated Iron Core>

Figure 1:
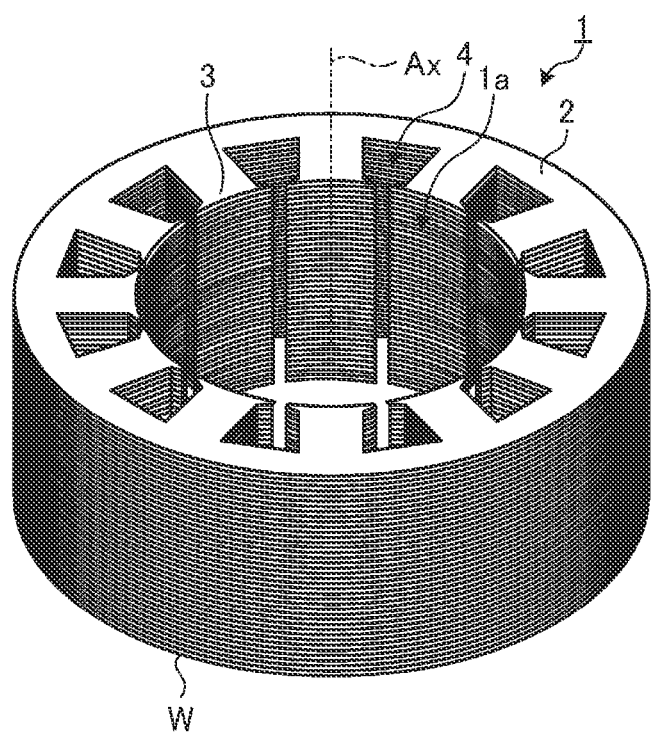
FIG. 1 is a perspective view showing an example of a laminated iron core according to an embodiment.

First, a configuration of a laminated iron core 1 according to an embodiment will be described with reference to FIG. 1. FIG. 1 is a perspective view showing an example of the laminated iron core 1 according to the embodiment. The laminated iron core 1 is, for example, a laminated stator core and is part of a stator.

The stator is obtained by attaching windings to the laminated iron core 1. A motor is configured by combining the stator with a rotor.

As shown in FIG. 1, the laminated iron core 1 has, for example, a cylindrical shape. That is, a central portion of the laminated iron core 1 is provided with a through hole 1a (center hole) extending along a central axis Ax. The rotor can be arranged in the through hole 1a.

The laminated iron core 1 is a laminate in which a plurality of iron core pieces W are laminated. The iron core piece W is a plate-shaped body obtained by punching a band-shaped magnetic steel sheet MS (see FIG. 2) into a predetermined shape.

The laminated iron core 1 according to the embodiment may be configured by so-called rotating lamination. The term "rotating lamination" refers to laminating the plurality of iron core pieces W while shifting angles of the iron core pieces W relatively. The rotating lamination is mainly performed for a purpose of canceling a plate thickness deviation of the laminated iron core 1. An angle of the rotating lamination may be set to any magnitude.

Each iron core piece W and the laminated iron core 1 include a yoke portion 2 and a plurality of teeth portions 3. The yoke portion 2 has an annular shape (for example, circular ring shape) and extends in a manner of surrounding the central axis Ax. A width, an inner diameter, an outer diameter, and a thickness of the yoke portion 2 in a radial direction can be set to various sizes according to applications and performance of the motor.

The teeth portions 3 extend along the radial direction of yoke portion 2 from an inner edge of yoke portion 2 toward a central axis Ax side. That is, the teeth portions 3 protrude in the radial direction from the inner edge of the yoke portion 2.

For example, in an example of FIG. 1, twelve teeth portions 3 are formed integrally with the yoke portion 2. The teeth portions 3 are arranged at substantially equal intervals in a circumferential direction of the yoke portion 2. A slot 4 functioning as a space for arranging a winding (not shown) is defined between adjacent teeth portions 3.

Figure 6:
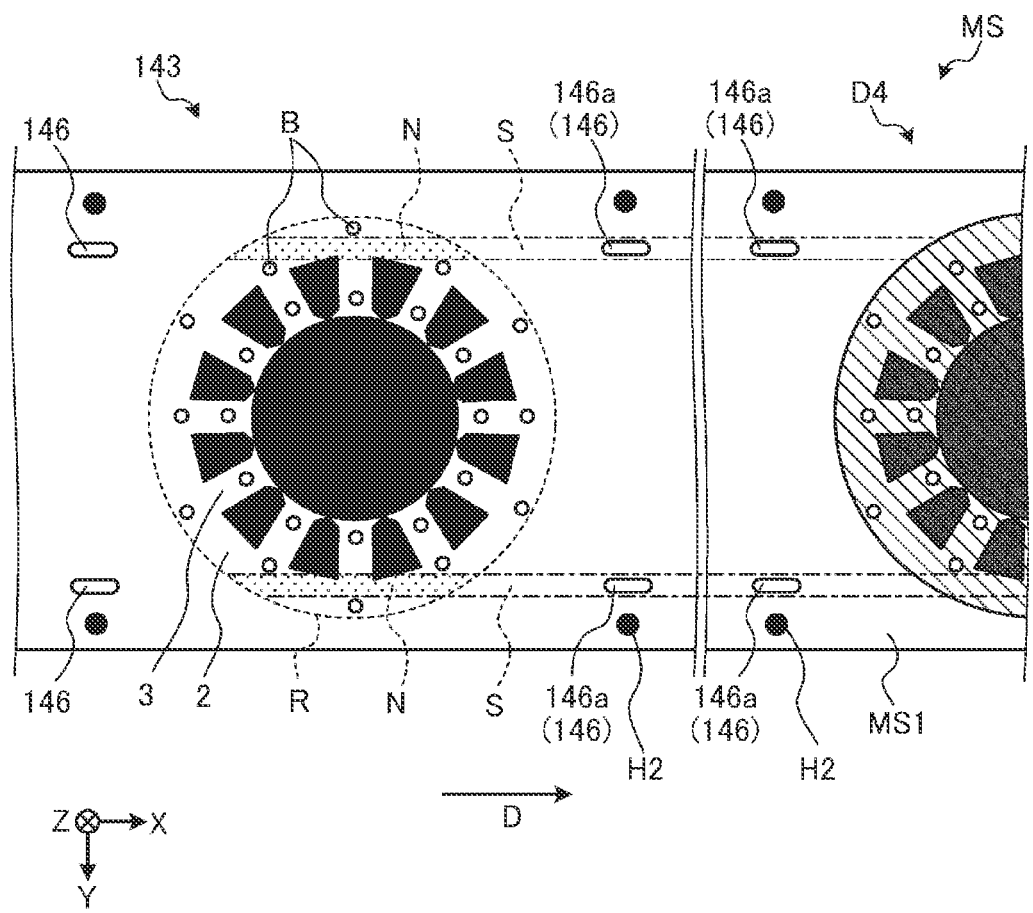
FIG. 6 is a bottom view showing an example of a magnetic steel sheet subjected to punching performed by the pressing device according to the embodiment.

The iron core pieces W that are adjacent in a height direction are joined with adhesives B (see FIG. 6). Details of the adhesive B will be described later.

<Manufacturing Apparatus>

Figure 2:
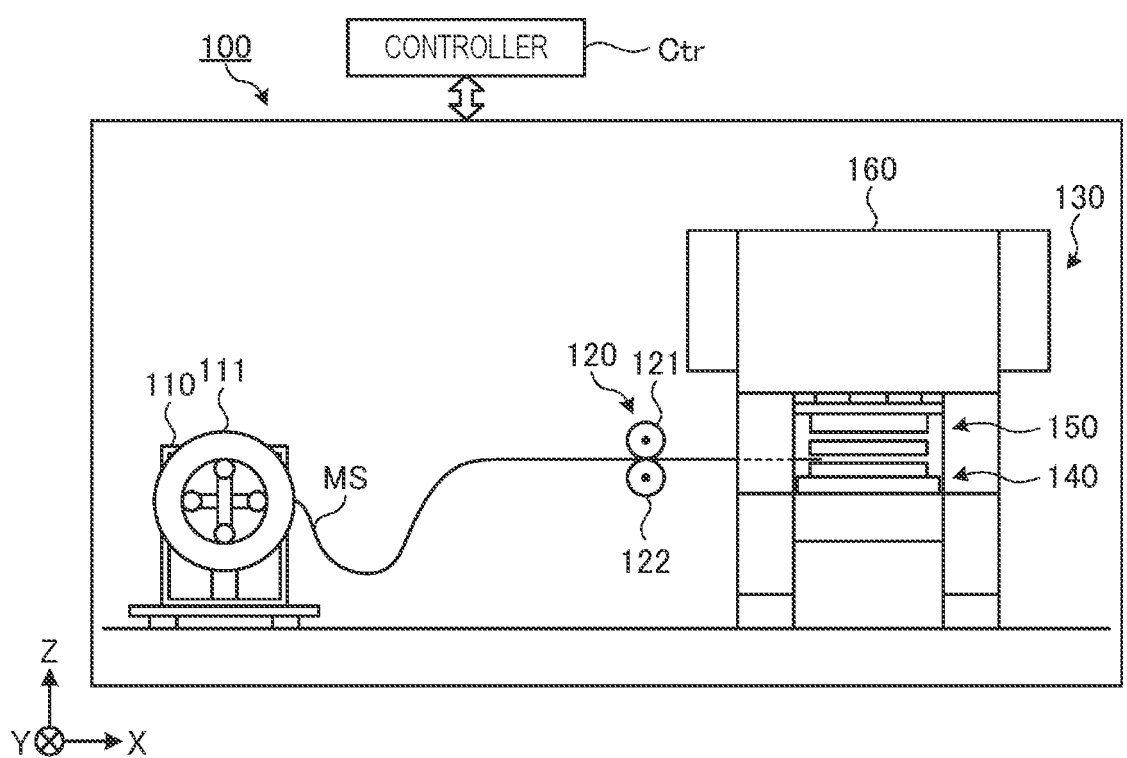
FIG. 2 is a perspective view showing an example of a manufacturing apparatus of the laminated iron core according to the embodiment.

Next, a manufacturing apparatus 100 of the laminated iron core according to the embodiment will be described with reference to FIG. 2. FIG. 2 is a perspective view showing an example of the manufacturing apparatus 100 of the laminated iron core according to the embodiment. The manufacturing apparatus 100 according to the embodiment is configured to manufacture a laminate 10 (see FIG. 3) of the iron core pieces W (see FIG. 1) from the band-shaped magnetic steel sheet MS.

In the drawings referred to below, in order to facilitate understanding, an X-axis direction, a Y-axis direction, and a Z-axis direction that are orthogonal to each other are defined, and an orthogonal coordinate system may be shown in which a Z-axis positive direction represents a vertically upward direction, an X-axis positive direction represents a progressive direction of the magnetic steel sheet MS, and a Y-axis represents a width direction of the magnetic steel sheet MS.

As shown in FIG. 2, the manufacturing apparatus 100 includes an uncoiler 110, a feeding device 120, a pressing device 130, and a controller Ctr (control unit). The pressing device 130 is an example of a progressive die machine.

The uncoiler 110 is configured to rotatably hold a coil material 111. The coil material 111 is obtained by winding the magnetic steel sheet MS in a coil shape (spiral shape). The magnetic steel sheet MS is an example of a metal plate.

The feeding device 120 includes a pair of rollers 121 and 122 that sandwich the magnetic steel sheet MS from above and below. The pair of rollers 121 and 122 are configured to rotate and stop based on an instruction signal from the controller Ctr, and progressively feed the magnetic steel sheet MS intermittently toward the pressing device 130 (hereinafter, also referred to as "progressive feeding"). That is, the pair of rollers 121 and 122 has a function as a conveying unit for conveying the magnetic steel sheet MS.

The pressing device 130 is configured to operate based on an instruction signal from the controller Ctr. The pressing device 130, for example, operates a plurality of punches P1 to P4 (see FIG. 3) to sequentially press (for example, perform punching and half-punching on) the magnetic steel sheet MS fed by the feeding device 120. Accordingly, the pressing device 130 is configured to form the plurality of iron core pieces W.

The pressing device 130 includes a lower die 140, an upper die 150, and a press machine 160. The lower die 140 is positioned below the progressively fed magnetic steel sheet MS, and supports the magnetic steel sheet MS from below. The upper die 150 is positioned above the progressively fed magnetic steel sheet MS, and presses the magnetic steel sheet MS by moving up and down. Details of the lower die 140 and the upper die 150 will be described later.

The press machine 160 is positioned above the upper die 150. A piston of the press machine 160 is connected to a punch holder 151 (see FIG. 3) that holds the plurality of punches provided on the upper die 150, and operates based on an instruction signal from the controller Ctr. When the press machine 160 operates, the piston thereof expands and contracts, and the upper die 150 moves up and down as a whole.

The controller Ctr is configured to generate an instruction signal for causing the feeding device 120 and the pressing device 130 to operate based on, for example, a program recorded in a recording medium (not shown) or an operation input from an operator. The controller Ctr is configured to transmit the instruction signal to the feeding device 120 and the pressing device 130.

<Pressing Device>

Figure 3:
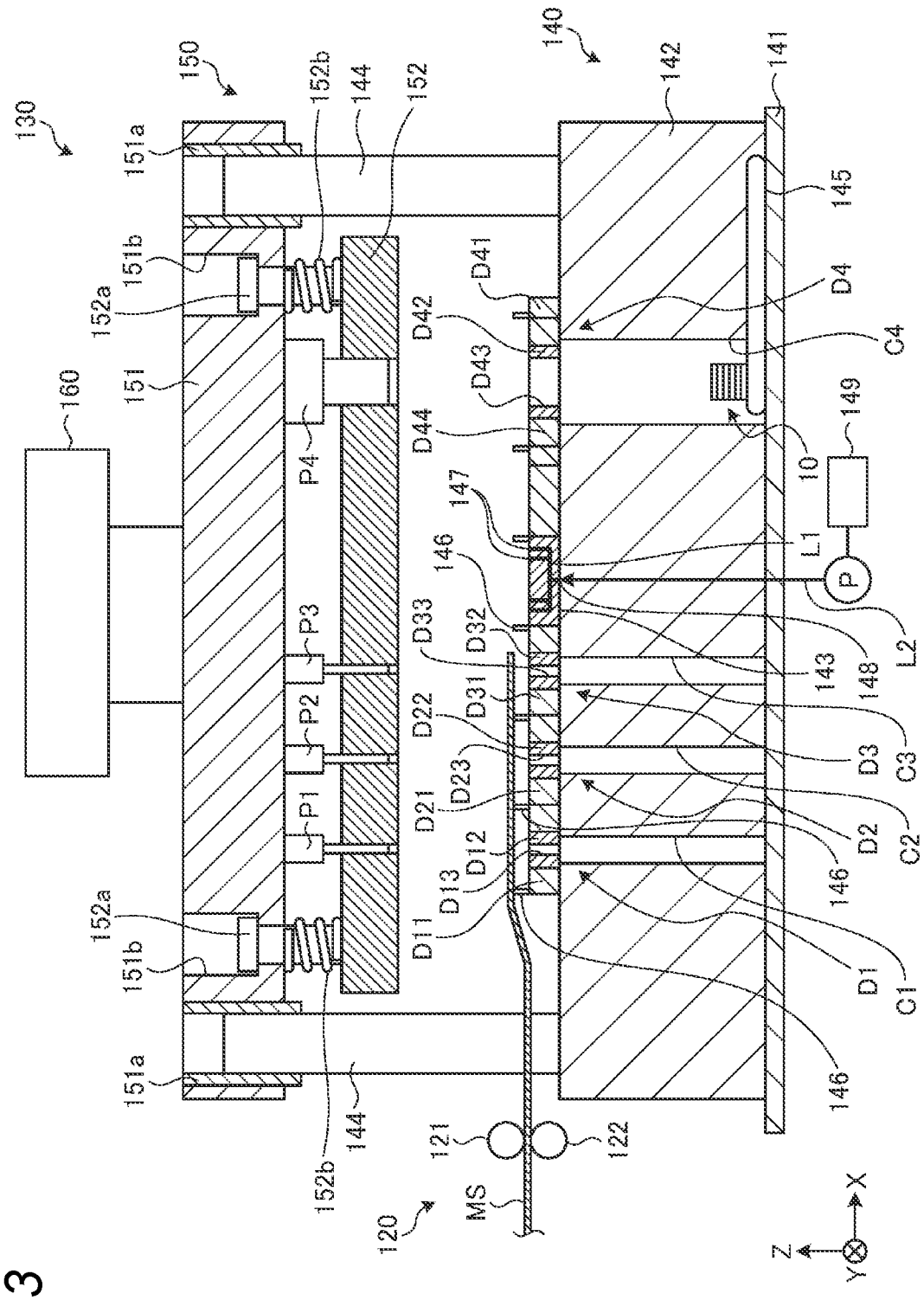
FIG. 3 is a schematic cross-sectional view showing an example of a pressing device according to the embodiment.

Next, details of the pressing device 130 according to the embodiment will be described with reference to FIGS. 3 and 4. FIG. 3 is a schematic cross-sectional view showing an example of the pressing device 130 according to the embodiment, and FIG. 4 is a plan view showing an example of the lower die 140 according to the embodiment.

Figure 4:
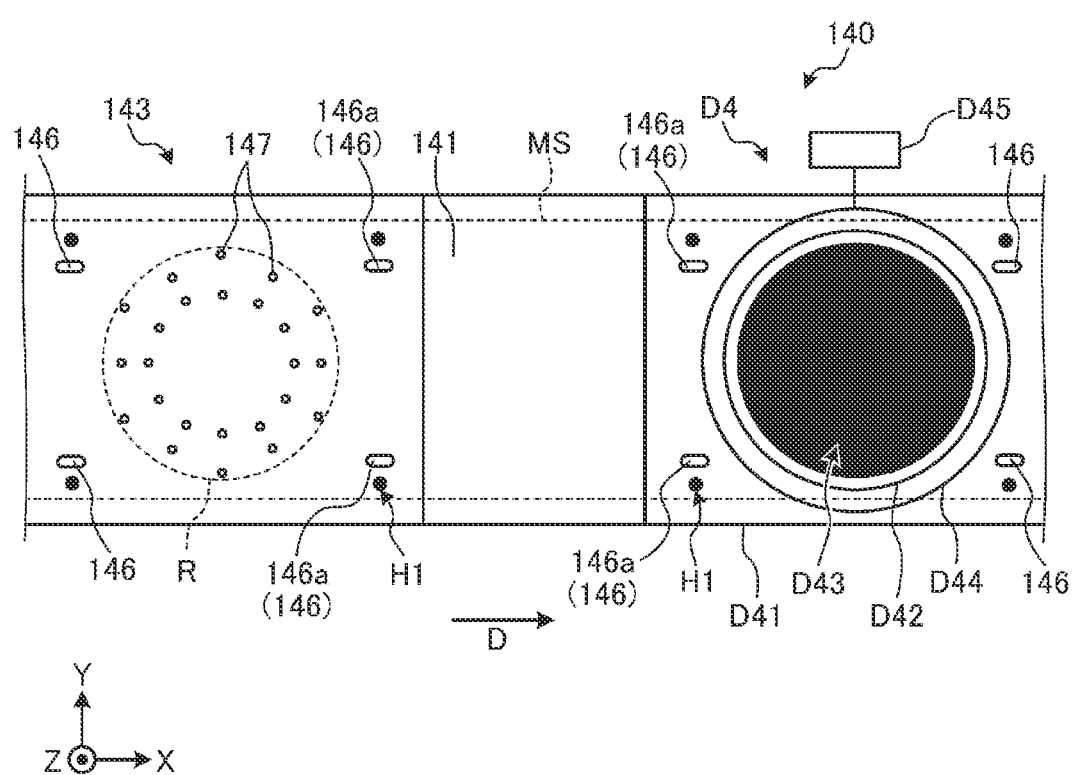
FIG. 4 is a plan view showing an example of a lower die according to the embodiment.

In order to facilitate understanding, FIG. 4 shows the lower die 140 corresponding to a last part of the punching, and also shows a position of the magnetic steel sheet MS or the like passing above the lower die 140.

As shown in FIG. 3, the pressing device 130 includes the lower die 140, the upper die 150, and the press machine 160. The lower die 140 includes a base 141, a die holder 142, die members D1 to D4, an applying unit 143, a plurality of guide posts 144, and a convey mechanism 145.

The base 141 is fixed, for example, on a floor surface and functions as a foundation for the entire pressing device 130. The die holder 142 is supported on the base 141. A plurality of discharge holes C1 to C4 are formed in the die holder 142. The die holder 142 may be made of, for example, a steel material (raw material) that has not been subjected to a heat treatment such as quenching.

The plurality of discharge holes C1 to C4 extend in an up-down direction inside the die holder 142, for example. Materials punched out from the magnetic steel sheet MS (for example, the iron core pieces W and waste materials) are discharged from the plurality of discharge holes C1 to C4.

The die members D1 to D4 are attached to an upper portion of the die holder 142 in a manner of being adjacent to each other in a conveying direction of the magnetic steel sheet MS. The plurality of die members D1 to D4 are arranged in an order from an upstream side to a downstream side in the conveying direction of the magnetic steel sheet MS. The applying unit 143 is provided between the die member D3 and the die member D4.

The die members D1 to D3 basically have a common configuration. The die member D1 includes a die plate D11 and a die D12. The die plate D11 is configured to hold the die D12 within a through hole formed in a center portion. The die plate D11 is configured from, for example, a steel material that has been subjected to the heat treatment such as quenching.

The die D12 is made of cemented carbide containing tungsten carbide, for example. A die hole D13 penetrating in the up-down direction is formed in the die D12. The die hole D13 and the punch P1 of the upper die 150 are configured as a unit for punching the magnetic steel sheet MS.

The die hole D13 communicates with the discharge hole C1 of the die holder 142. By inserting and removing the punch P1 into and from the die hole D13, the magnetic steel sheet MS is punched into a shape along a contour of the die hole D13. The metal piece punched out from the magnetic steel sheet MS is discharged to the outside of the pressing device 130 through the discharge hole C1.

The die member D2 includes a die plate D21 and a die D22. The die plate D21 is configured to hold the die D22 within a through hole formed in a center portion. Materials of the die plate D21 and the die D22 may be the same as those of the die plate D11 and the die D12, respectively.

A die hole D23 penetrating in the up-down direction is formed in the die D22. The die hole D23 and the punch P2 of the upper die 150 are configured as a unit for punching the magnetic steel sheet MS.

The die hole D23 communicates with the discharge hole C2 of the die holder 142. By inserting and removing the punch P2 into and from the die hole D23, the magnetic steel sheet MS is punched into a shape along a contour of the die hole D23. The metal piece punched out from the magnetic steel sheet MS is discharged to the outside of the pressing device 130 through the discharge hole C2.

The die member D3 includes a die plate D31 and a die D32. The die plate D31 is configured to hold the die D32 within a through hole formed in a center portion. Materials of the die plate D31 and the die D32 may be the same as those of the die plate D11 and the die D12, respectively.

A die hole D33 penetrating in the up-down direction is formed in the die D32. The die hole D33 and the punch P3 of the upper die 150 are configured as a unit for punching the magnetic steel sheet MS.

The die hole D33 communicates with the discharge hole C3 of the die holder 142. By inserting and removing the punch P3 into and from the die hole D33, the magnetic steel sheet MS is punched into a shape along a contour of the die hole D33. The metal piece punched out from the magnetic steel sheet MS is discharged to the outside of the pressing device 130 through the discharge hole C3.

In the present disclosure, for example, a through hole of the iron core piece W corresponding to the through hole 1a (see FIG. 1) and recess portions of the iron core piece W corresponding to the slots 4 (see FIG. 2) are formed in the magnetic steel sheet MS by punching with the die members D1 to D3.

The applying unit 143 has a function of applying the adhesives B (see FIG. 6) to a lower surface MS1 (see FIG. 6) of the magnetic steel sheet MS. As shown in FIG. 4, the applying unit 143 is a rectangular plate-shaped body and can be disposed on the die holder 142 in the same manner as the die members D1 to D4.

A plurality of ejection ports 147 for discharging the adhesive B are formed on a surface of the applying unit 143. The ejection ports 147 are arranged, for example, in a substantially circular ring shape in a plan view, and are arranged such that the adhesives B are applied to an iron core piece region R corresponding to the iron core piece W. A specific arrangement of the adhesives B in such an iron core piece region R will be described later.

As shown in FIG. 3, a supply path L1 connected to the ejection ports 147 and supplying the adhesive B to the ejection ports 147 is provided inside the applying unit 143. An end portion 148 on a side opposite to an ejection port 147 side of the supply path L1 is connected via a pipe L2 to a tank 149 provided outside.

A pump P is provided in the pipe L2 between the tank 149 and the end portion 148. The pump P supplies the adhesive B from the tank 149 to the applying unit 143 by being driven, for example, based on an instruction from the controller Ctr. The adhesive B supplied to the applying unit 143 is discharged toward the lower surface MS1 of the magnetic steel sheet MS from the plurality of ejection ports 147 via the supply path L1.

The die member D4 includes a die plate D41, a die D42, a rotation member D44, and a drive mechanism D45. The die plate D41 is configured to hold the die D42 supported by the rotation member D44 within a through hole formed in a center portion.

The rotation member D44 is provided between the die plate D41 and the die D42. The rotation member D44 is held with respect to the die plate D41 to be rotatable around a central axis extending along a vertical direction.

The die D42 is supported by the rotation member D44. Accordingly, the die D42 is rotatable about the central axis extending in the vertical direction with respect to the die plate D41 while being supported by the rotation member D44. A material of the die plate D41 may be the same as the material of the die plate D11, and materials of the die D42 and the rotation member D44 may be the same as the material of the die D12.

A die hole D43 penetrating in the up-down direction is formed in the die D42. The die hole D43 and the punch P4 of the upper die 150 are configured as a unit for punching the magnetic steel sheet MS. By punching the magnetic steel sheet MS using such a unit, the iron core piece W is formed from the magnetic steel sheet MS. The die hole D43 has a circular shape as a whole, for example.

The die hole D43 communicates with the discharge hole C4 of the die holder 142. By inserting and removing the punch P4 into and from the die hole D43, the magnetic steel sheet MS is punched into a shape along a contour of the die hole D43. The iron core piece W punched out from the magnetic steel sheet MS is laminated in the die hole D43 and on the iron core piece W punched in advance.

In this case, the iron core piece W punched out from the magnetic steel sheet MS is adhered to the iron core piece W punched in advance by the adhesive B applied to the lower surface MS1 of the iron core piece W. After a predetermined number of iron core pieces W are laminated in the die hole D43, the obtained laminate 10 is placed on the convey mechanism 145 through the discharge hole C4.

The drive mechanism D45 is connected to the rotation member D44. The drive mechanism D45 causes the rotation member D44 to rotate around central axes of the rotation member D44 and the die D42 based on an instruction signal from the controller Ctr.

Accordingly, the controller Ctr can rotate the iron core piece W punched from the magnetic steel sheet MS to laminate onto the iron core piece W laminated in advance. That is, the rotation member D44 and the drive mechanism D45 function as a rotating lamination unit that rotates and laminates the iron core piece W. The drive mechanism D45 is configured by, for example, a combination of a rotary motor, a gear, a timing belt, and the like.

The plurality of guide posts 144 linearly extend upward from the die holder 142, as shown in FIG. 3. The plurality of guide posts 144 are configured to guide the upper die 150, together with guide bushes 151a, in the up-down direction. The plurality of guide posts 144 may be attached to the upper die 150 in a manner of extending downward from the upper die 150.

The convey mechanism 145 is configured to operate based on an instruction from the controller Ctr, and to feed the laminate 10 dropped from the die D42 to a subsequent device (for example, a magnet attaching device, a resin injection device, a welding device, and a shaft attaching device).

In the convey mechanism 145, one end of the convey mechanism 145 is located inside the discharge hole C4 and the other end of the convey mechanism 145 is located outside the pressing device 130. The convey mechanism 145 is, for example, a belt conveyor.

As shown in FIG. 3, surfaces of the die plates D11 to D41 and the applying unit 143 are flat. The die plates D11 to D41 and the applying unit 143 are provided with lifters 146 protruding upward from surfaces thereof.

The lifters 146 are provided to support the magnetic steel sheet MS conveyed over the die plates D11 to D41 and the applying unit 143 while being separated from the surfaces of the die plates D11 to D41 and the applying unit 143.

The arrangement of the lifters 146 is not particularly limited. In FIG. 4, the magnetic steel sheet MS conveyed on the die member is indicated by a dashed line, and as an example, the lifters 146 can be provided near both ends of the magnetic steel sheet MS conveyed on the die plates D31 and D41.

As shown in FIG. 4, the plurality of lifters 146 are arranged, for example, along a direction D in which the magnetic steel sheet MS is fed progressively. The direction D is an example of a predetermined direction.

Regarding the lifters 146, when punching is performed on the magnetic steel sheet MS by upward and downward movement of the upper die 150, upper ends of the lifters 146 can be level with the surfaces of the die plates D11 to D41 and the applying unit 143. For example, each lifter 146 can be configured to move in the up-down direction by supporting a pin extending in the up-down direction with an elastic member provided below the pin.

According to such a configuration, the lifters 146 that are not biased by the upper die 150 extend upward when the magnetic steel sheet MS is conveyed, and thus, the lifters 146 can support the magnetic steel sheet MS while being separated from the surfaces of the die plates D11 to D41 and the applying unit 143.

On the other hand, the lifters 146 biased by the upper die 150 move downward when the punching is performed on the magnetic steel sheet MS, so that the magnetic steel sheet MS is pressed against the surfaces of the die plates D11 to D41 and the applying unit 143. The lifters 146 are not limited to the above configuration.

As shown in FIG. 4, a plurality of pilot holes H1 are formed in the surfaces of the die plates D11 to D41 and the applying unit 143. Such a plurality of pilot holes H1 are formed in a manner of extending in the vertical direction inside the die plates D11 to D41 and the applying unit 143.

Such pilot holes H1 are reference holes for positioning the magnetic steel sheet MS by pilot pins (not shown) provided on the upper die 150 when the magnetic steel sheet MS is punched by the punches P1 to P4.

The example of FIG. 3 shows that the die members D1 to D3, the applying unit 143, and the die member D4 are integrally configured, but the present disclosure is not limited to such an example, and the die members D1 to D3, the applying unit 143, and the die member D4 may be configured separately.

The upper die 150 includes the punch holder 151, a stripper 152, and the plurality of punches P1 to P4. The punch holder 151 is disposed above the die holder 142 in a manner of facing the die holder 142. The punch holder 151 is configured to hold the plurality of punches P1 to P4 on a lower surface side of the punch holder 151.

The punch holder 151 is provided with the plurality of guide bushes 151a. The plurality of guide bushes 151a are positioned to correspond to the plurality of guide posts 144, respectively. The guide bush 151a is cylindrical, for example, and the guide post 144 can be inserted through an inner space of the guide bush 151a. If the guide post 144 is attached to the upper die 150, the guide bush 151a may be provided to the lower die 140.

A plurality of through holes 151b are formed in the punch holder 151. A step is formed on an inner peripheral surface of the through hole 151b. Therefore, a diameter of an upper portion of the through hole 151b is set larger than a diameter of a lower portion of the through hole 151b.

The stripper 152 is configured to remove, from the punches P1 to P4, the magnetic steel sheet MS that sticks to the punches P1 to P4 when the magnetic steel sheet MS is punched by the punches P1 to P4. At the same time, the stripper 152 is configured to press the magnetic steel sheet MS against the die plates D11 to D41 and the applying unit 143 when the punches P1 to P4 punch the magnetic steel sheet MS.

The stripper 152 presses the magnetic steel sheet MS against the applying unit 143, so that the adhesive B ejected from the ejection port 147 is applied to a predetermined position on the lower surface MS1 of the magnetic steel sheet MS. The stripper 152 is disposed between the die members D1 to D4 (and the applying unit 143) and the punch holder 151.

The stripper 152 is connected to the punch holder 151 via connection members 152a. Each connection member 152a includes an elongated main body and a head provided at an upper end of the main body. The main body of the connection member 152a is inserted into the lower portion of the through hole 151b and can move up and down within the through hole 151b.

A lower end of the main body of the connection member 152a is fixed to the stripper 152. A biasing member 152b such as a compression coil spring is attached around the main body of the connection member 152a and is positioned between the punch holder 151 and the stripper 152, for example.

The head of the connection member 152a is positioned at the upper portion of the through hole 151b. An outer shape of the head of the connection member 152a is set larger than an outer shape of the main body of the connection member 152a when viewed from above.

Therefore, the head of the connection member 152a functions as a stopper to prevent the main body from falling out of the through hole 151b when the main body moves up and down. Further, the stripper 152 is suspended from the punch holder 151 by the head of the connection member 152a.

A plurality of through holes are formed in the stripper 152 at positions corresponding to the punches P1 to P4. The through holes extend in the up-down direction. The through holes respectively communicate with the corresponding die hole D13 to D43 when viewed from above. Lower portions of the punches P1 to P4 are respectively inserted into the through holes. The lower portions of the punches P1 to P4 are slidable within the respective through holes.

The punches P1 to P4 are arranged in an order from an upstream side toward a downstream side of the pressing device 130. The lower end portions of the punches P1 to P4 have shapes corresponding to the die holes D13 to D43, respectively.

The example of FIG. 3 shows that four die members and four punches are provided in the pressing device 130, but the present disclosure is not limited to such an example, and the number of die members and punches can be changed variously according to the shapes of the laminated iron core 1 and the iron core piece W.

The press machine 160 is positioned above the upper die 150. The piston of the press machine 160 is connected to the punch holder 151 and operates based on the instruction signal from the controller Ctr. When the press machine 160 operates, the piston thereof expands and contracts, and the upper die 150 moves up and down as a whole.

<Manufacturing Process>

Figure 5:
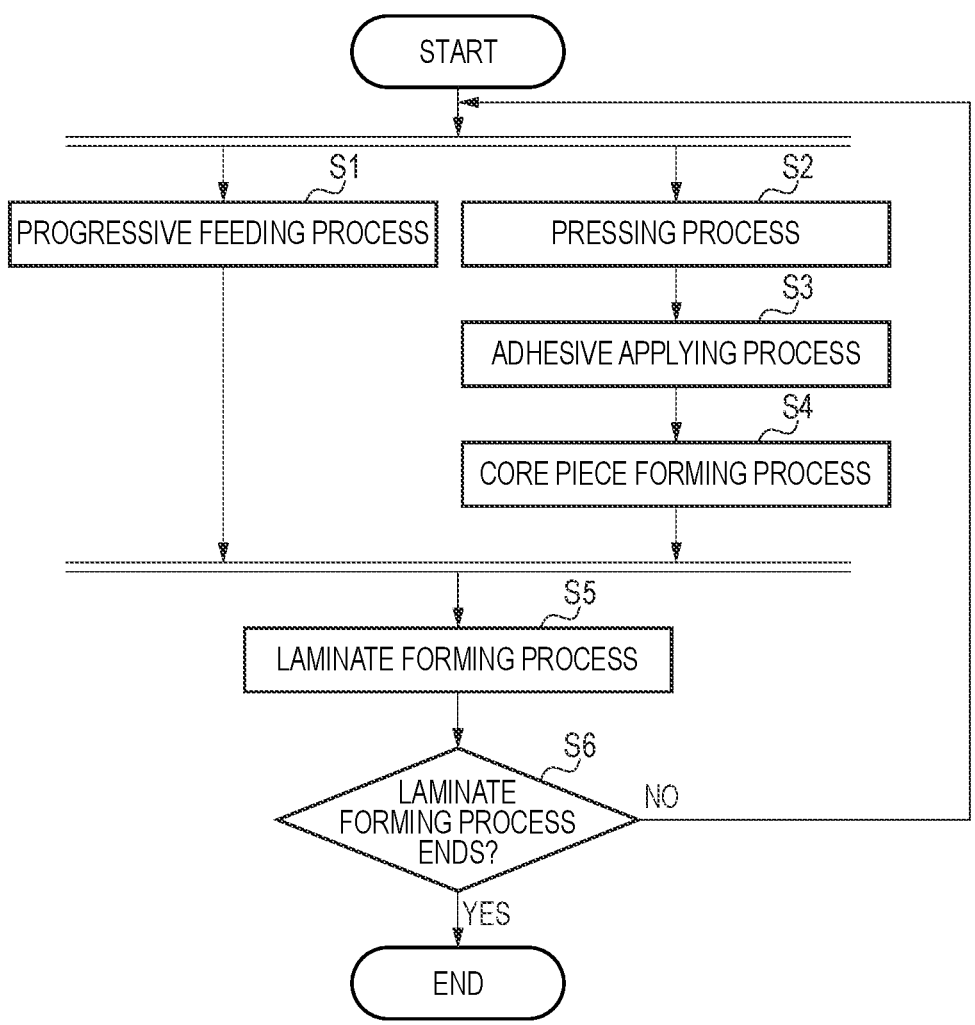
FIG. 5 is a flowchart showing an example of a procedure of manufacturing processes executed by the pressing device according to the embodiment.

Next, manufacturing processes of the laminated iron core 1 in the pressing device 130 according to the embodiment will be described with reference to FIGS. 5 and 6 in addition to FIGS. 3 and 4 which have been described. FIG. 5 is a flowchart showing an example of a procedure of the manufacturing processes executed by the pressing device 130 according to the embodiment.

As shown in FIG. 5, the controller Ctr (see FIG. 1) first controls the feeding device 120 (see FIG. 2) and the like to feed the magnetic steel sheet MS (see FIG. 2) progressively by a predetermined pitch along the direction D in the pressing device 130 (see FIG. 2) (step S1).

Further, in parallel with the process of step S1, a pressing process (step S2), an adhesive applying process (step S3), and an iron core piece forming process (step S4) are performed in this order.

In the pressing process (step S2), the controller Ctr controls the pressing device 130 to lower the upper die 150 (see FIG. 3) to sandwich the magnetic steel sheet MS between the upper die 150 and the lower die 140 (see FIG. 3), and the magnetic steel sheet MS is pressed. Accordingly, the teeth portions 3 (see FIG. 1) and the like are formed in the iron core piece W (see FIG. 1).

In the adhesive applying process (step S3), the controller Ctr controls the applying unit 143 (see FIG. 4) to apply the adhesive B to the lower surface MS1 (see FIG. 6) of the magnetic steel sheet MS. The adhesive B is not applied to the lowermost iron core piece W in the laminate 10 (see FIG. 3).

In the iron core piece forming process (step S4), the controller Ctr controls the pressing device 130 to lower the upper die 150 to sandwich the magnetic steel sheet MS between the upper die 150 and the lower die 140, and the magnetic steel sheet MS is punched to form the iron core piece W.

Next, the controller Ctr controls the pressing device 130 to laminate the plurality of iron core pieces W to form the laminate 10 which becomes the laminated iron core 1 (step S5).

Next, the controller Ctr determines whether a process of laminating a predetermined number of iron core pieces W to form the laminate 10 is ended (step S6). Then, when the process of forming the laminate 10 is ended (step S6, Yes), a series of processes is ended. On the other hand, if the process of forming the laminate 10 is not ended (step S6, No), the process returns to steps S1 and S2.

Next, details of the adhesive applying process to which the technique of the present disclosure is applied will be described with reference to FIG. 6. FIG. 6 is a bottom view showing an example of the magnetic steel sheet MS subjected to punching by the pressing device 130 according to the embodiment.

In order to facilitate understanding, FIG. 6 shows the magnetic steel sheet MS corresponding to the last part of the punching, and also shows positions of the lifters 146 or the like provided on the lower die 140 (see FIG. 4).

In addition, the parts shown in black in FIG. 6 are parts punched before reaching the applying unit 143 and the die member D1. That is, as shown in FIG. 6, when the magnetic steel sheet MS according to the embodiment reaches the applying unit 143 that applies the adhesive B and the die member D4 that performs the punching, parts corresponding to the through hole 1a (see FIG. 1) and the slots 4 (see FIG. 1) are punched out.

In the magnetic steel sheet MS, pilot holes H2 are formed by punching in both edge portions of the die members D1 to D3 (see FIG. 3) on the upstream side. Such pilot holes H2 are formed in the die members provided in the pressing device 130 (see FIG. 1) to position the magnetic steel sheet MS with pilot pins (not shown) during the punching of the magnetic steel sheet MS performed by the punches P1 to P4 (see FIG. 3).

Then, the applying unit 143 in the pressing device 130 applies the adhesive B to the lower surface MS1 of the magnetic steel sheet MS. Further, the pressing device 130 punches out the parts corresponding to the entire iron core piece W (see FIG. 1) from the magnetic steel sheet MS which is progressively fed along the direction D from the applying unit 143 to the die member D4.

In FIG. 6, the parts hatched with oblique lines are parts to be punched in the die member D4. Accordingly, one iron core piece W is formed in the pressing device 130.

Here, in the embodiment, the adhesives B applied to the iron core piece region R corresponding to the iron core piece W are arranged evenly in the yoke portion 2 in the circumferential direction. For example, in the example of FIG. 6, twelve adhesives B applied to the yoke portion 2 are evenly arranged at intervals of 30 (degrees) in the circumferential direction.

Furthermore, in the embodiment, as shown in FIG. 6, in the process of applying the adhesives B, regions N are formed in a part of the iron core piece region R corresponding to the iron core piece W. The regions N are regions where the iron core piece region R corresponding to the iron core piece W overlaps contact regions S where lifters 146a contact the lower surface MS1 of the magnetic steel sheet MS.

Among the plurality of lifters 146, the lifters 146a are lifters positioned between the ejection port group provided in the applying unit 143 and the die hole D43 (see FIG. 4) of the die member D4. The plurality of lifters 146a (four in the drawing) are provided in the pressing device 130, for example, and the plurality of lifters 146a are arranged in two rows along the direction D.

As shown in FIG. 6, when the lifters 146 are arranged along the direction D, the lifters 146a on a downstream side of the ejection port group provided in the applying unit 143 support the magnetic steel sheet MS after the adhesives B are applied.

Under such conditions, the lifters 146a can come into contact with the contact regions S indicated by dashed lines on the lower surface MS1 of the magnetic steel sheet MS. The contact regions S extend along the progressively feeding direction D and overlap the lifters 146a.

In the embodiment, in the entire yoke portion 2, the plurality of adhesives B are arranged at different radial distances from the central axis Ax (see FIG. 1) of the iron core piece W and evenly arranged in the circumferential direction, so that the adhesives B can be prevented from being applied to the regions N. Accordingly, the adhesion of the adhesives B to the lifters 146 can be prevented.

In the embodiment, the adhesion of the adhesives B to the lifters 146 can be prevented while the magnetic steel sheet MS is prevented from being widened, and thus, an increase in material costs can also be prevented.

In the embodiment, it is preferable that the plurality of adhesives B are evenly arranged in the yoke portion 2 of the iron core piece W in the circumferential direction. Accordingly, even in the laminated iron core 1 formed by laminating the iron core pieces W each having the regions N as described above, rigidity can be prevented from decreasing only in one direction. Furthermore, in the embodiment, occurrence of unevenness in the thickness depending on the presence or absence of the adhesive B can be prevented.

The example of FIG. 6 shows that the twelve adhesives B applied to the yoke portion 2 are evenly arranged at the intervals of 30 (degrees) in the circumferential direction, but the present disclosure is not limited to such an example, and the number of adhesives B applied to the yoke portion 2 can be set as appropriate.

In the embodiment, the plurality of adhesives B arranged in the circumferential direction in the yoke portion 2 may be arranged in a staggered manner. Accordingly, the plurality of adhesives B can be arranged in a well-balanced manner on the entire yoke portion 2, so that the decrease in the rigidity only in one direction can be prevented.

In the embodiment, the adhesives B may also be disposed on the teeth portions 3 of the iron core piece W. For example, in the example of FIG. 6, the adhesive B is arranged on each of the teeth portions 3 positioned side by side in the circumferential direction. The plurality of adhesives B positioned on all the teeth portions 3 have the same radial distance from the central axis Ax of the iron core piece W and are evenly arranged in the circumferential direction.

In the embodiment, the plurality of iron core pieces W may be laminated while being rotated, or the plurality of iron core pieces W may be laminated without being rotated. For example, when the plurality of iron core pieces W are laminated while being rotated, in the embodiment, the adjacent adhesives B along a laminating direction may be arranged at different positions (that is, not overlapping) in the plan view.

Accordingly, the plurality of adhesives B are further arranged evenly in the circumferential direction in the yoke portion 2 of the iron core piece W, so that the rigidity of the laminated iron core 1 can be further prevented from decreasing in only one direction.

When the plurality of iron core pieces W are laminated while being rotated, the rotating lamination may be performed while shifting the angle for each sheet, or the rotating lamination may be performed while shifting the angle for the plurality of sheets. As a result, the adhesives B adjacent to each other along the laminating direction may be arranged in a manner of overlapping each other in the plan view.

Even when the adhesives B adjacent to each other along the laminating direction are arranged in a manner of overlapping each other in the plan view, the plurality of adhesives B are arranged evenly in the circumferential direction in the yoke portion 2 of the iron core piece W, so that the rigidity of the laminated iron core 1 can be further prevented from decreasing in only one direction.

Various Modifications

Figure 7:
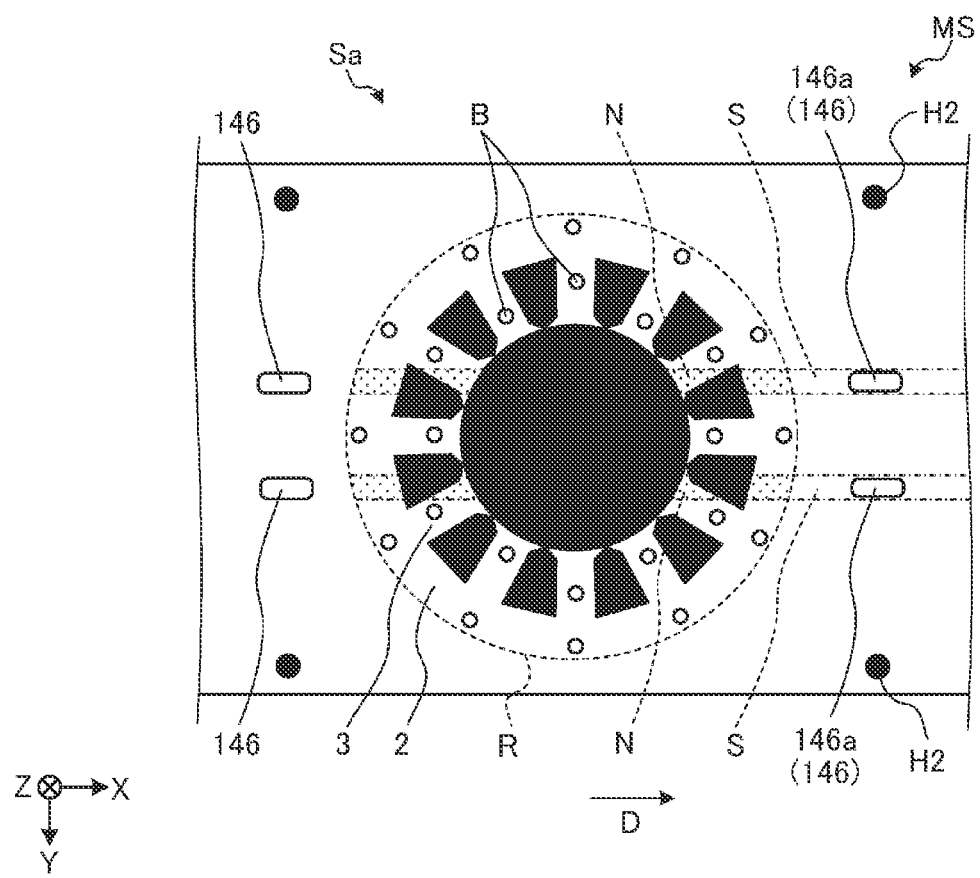
FIG. 7 is a bottom view showing an example of a magnetic steel sheet subjected to punching performed by a pressing device according to a first modification of the embodiment.

Next, various modifications of the above embodiment will be described with reference to FIG. 7 to FIG. 9. FIG. 7 is a bottom view showing an example of the magnetic steel sheet MS subjected to the punching performed by the pressing device 130 according to a first modification of the embodiment.

As shown in FIG. 7, in the first modification, the plurality of adhesives B arranged on the yoke portion 2 are arranged at the same radial distance from the central axis Ax (see FIG. 1) of the iron core piece W and evenly arranged in the circumferential direction.

On the other hand, in the first modification, the plurality of adhesives B positioned on all the teeth portions 3 are arranged at different radial distances from the central axis Ax of the iron core piece W and evenly arranged in the circumferential direction. For example, in the example of FIG. 7, the plurality of adhesives B are arranged in a staggered manner in the circumferential direction on all the teeth portions 3.

Accordingly, the adhesives B can be prevented from being applied to the regions N which is formed in the teeth portions 3 and the yoke portion 2 in a manner of extending along the direction D. Therefore, according to the first modification, the adhesion of the adhesives B to the lifters 146 can be prevented even when the lifter 146 is arranged inside compared to the above embodiment.

Figure 8:
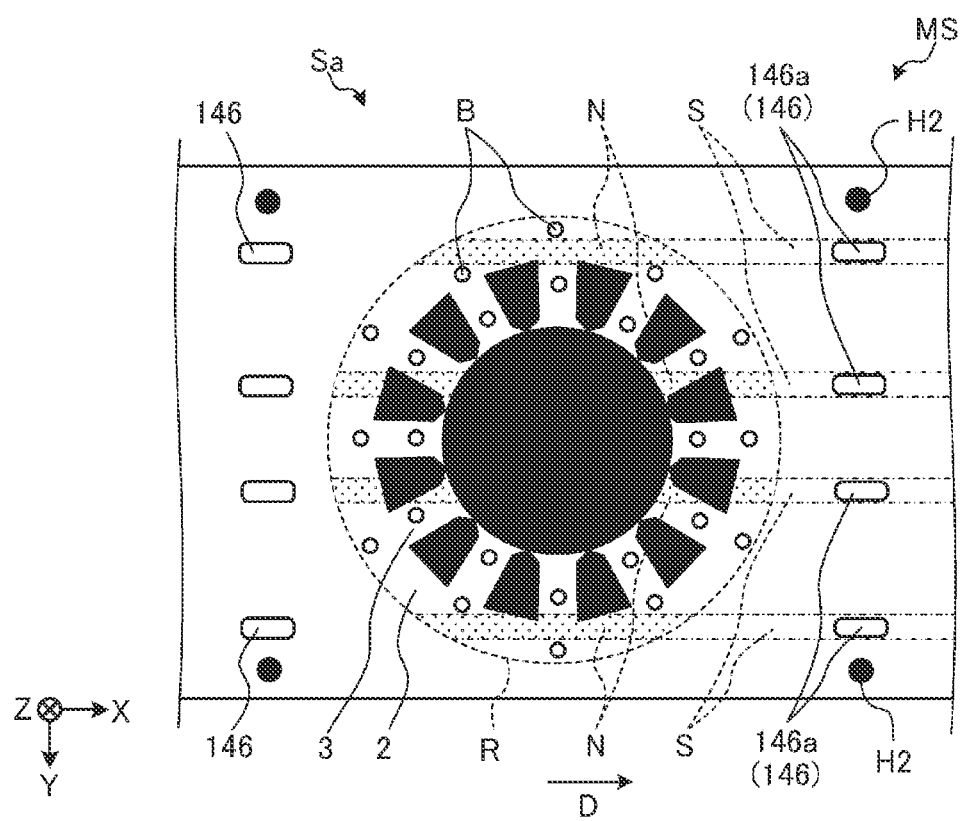
FIG. 8 is a bottom view showing an example of a magnetic steel sheet subjected to punching performed by a pressing device according to a second modification of the embodiment.

FIG. 8 is a bottom view showing an example of the magnetic steel sheet MS subjected to the punching performed by the pressing device 130 according to a second modification of the embodiment. As shown in FIG. 8, in the second modification, the plurality of adhesives B positioned on the entire yoke portion 2 and all the teeth portions 3 are arranged at different radial distances from the central axis Ax of the iron core piece W and evenly arranged in the circumferential direction.

For example, in the second modification, the plurality of adhesives B respectively positioned on the entire yoke portion 2 and all the tooth portion 3 are arranged in a staggered manner in the circumferential direction.

Accordingly, the adhesives B can be prevented from being applied to the regions N which is formed in the yoke portion 2 and the teeth portions 3 in the manner of extending along the direction D. Therefore, according to the second modification, the adhesion of the adhesives B to the lifters 146 can be prevented even when the lifter 146 is arranged outside and inside the magnetic steel sheet MS.

Figure 9:
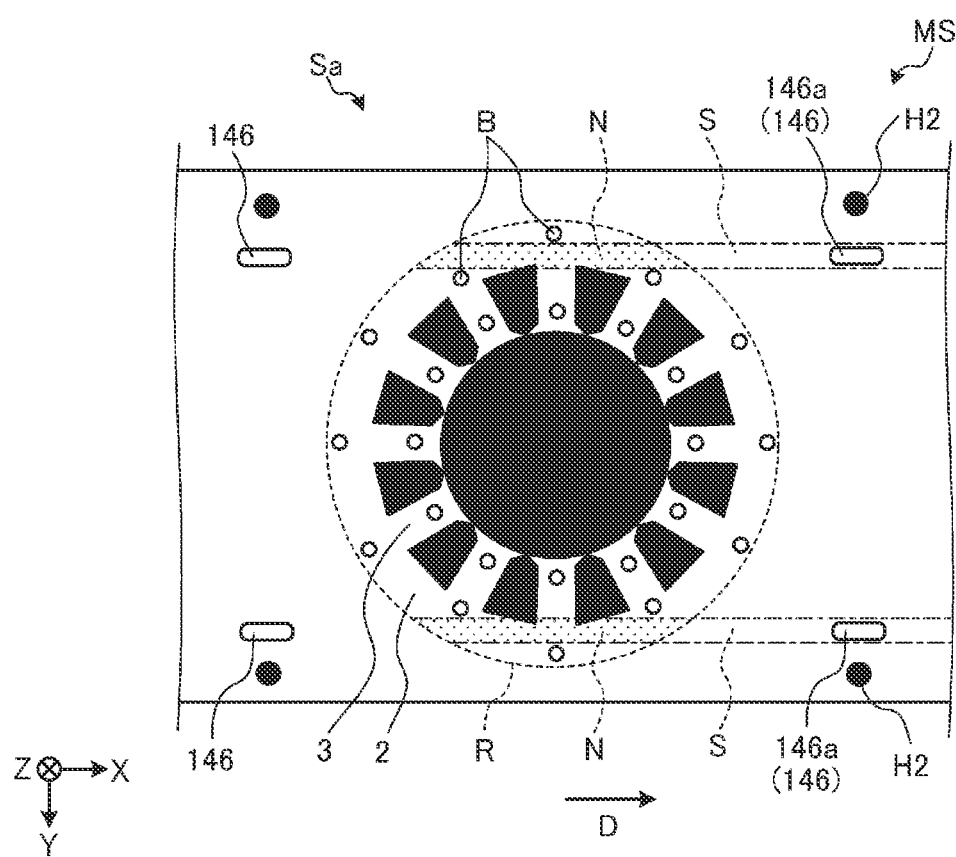
FIG. 9 is a bottom view showing an example of a magnetic steel sheet subjected to the punching performed by a pressing device according to a third modification of the embodiment.

FIG. 9 is a bottom view showing an example of the magnetic steel sheet MS subjected to the punching performed by the pressing device 130 according to a third modification of the embodiment.

As shown in FIG. 9, in the third modification, the arrangement of the plurality of adhesives B in the yoke portion 2 is different from that in the above embodiment. Specifically, in the third modification, among the plurality of adhesives B positioned on the yoke portion 2, the adhesives B that can approach the contact regions S are arranged in a staggered manner, while the other adhesives B are arranged such that the radial distances from the central axis Ax (see FIG. 1) of the iron core piece W are the same.

Also in this case, by arranging the adhesives B in the staggered manner that can approach the contact regions S, it is possible not to apply the adhesive B to the region N formed in the yoke portion 2 so as to extend along the direction D. Therefore, according to the third modification, the adhesion of the adhesives B to the lifters 146 can be prevented.

The embodiment of the present invention has been described above, but the present invention is not limited to the above embodiment, and various modifications can be made without departing from the scope of the present invention. For example, in the above embodiment, the example in which the plurality of lifters 146a are disposed in a manner of passing through the regions N of the iron core piece W has been described, but the present disclosure is not limited to such an example, and one lifter 146a may be disposed in a manner of passing through the regions N of the iron core piece W.

In the above embodiment, the pressing device 130 for punching the magnetic steel sheet MS is shown, but the present disclosure is not limited to such an example. For example, the magnetic steel sheet MS may be half-punched, or a metal plate different from the magnetic steel sheet MS may be punched or half-punched.

As described above, the laminated iron core 1 according to the embodiment includes the plurality of laminated iron core pieces W and the adhesive B that bonds the iron core pieces W adjacent to each other. The iron core piece W includes the annular yoke portion 2 and the plurality of teeth portions 3 protruding from the yoke portion 2 along the radial direction. On at least one of the entire yoke portion 2 and all the teeth portions 3, the adhesives B are arranged at different radial distances from the central axis Ax of the iron core piece W and evenly arranged in the circumferential direction. Accordingly, the adhesion of the adhesives B to the lifters 146 can be prevented.

In the laminated iron core 1 according to the embodiment, each iron core piece W has the regions N arranged along the predetermined direction D, and the regions N are not applied with the adhesive B. Accordingly, the adhesion of the adhesives B to the lifters 146 can be prevented.

In the laminated iron core 1 according to the embodiment, the adhesives B are arranged in the staggered manner in the circumferential direction. Accordingly, the decrease in the rigidity only in one direction can be further prevented.

In the laminated iron core 1 according to the embodiment, the adhesives B adjacent to each other along the laminating direction are arranged in a manner of overlapping each other in the plan view. Accordingly, the decrease in the rigidity in only one direction in the laminated iron core 1 can be prevented.

In the laminated iron core 1 according to the embodiment, the adhesives B adjacent to each other along the laminating direction are arranged at different positions in the plan view. Accordingly, the decrease in the rigidity only in one direction in the laminated iron core 1 can be further prevented.

The manufacturing method of the laminated iron core 1 according to the embodiment includes the process of progressively feeding (step S1), the process of applying (step S3), the process of forming (step S4), and the process of laminating (step S5). In the process of progressively feeding (step S1), the metal plate (magnetic steel sheet MS) is fed progressively in the predetermined direction D while the lower surface MS1 of the metal plate (magnetic steel sheet MS) is supported by the plurality of lifters 146. In the process of applying (step S3), on the lower surface MS1 of the metal plate (magnetic steel sheet MS), the adhesives B are applied to the iron core piece region R which is the iron core piece W having the annular yoke portion 2 and the plurality of teeth portions 3 projecting radially from the yoke portion 2. In the process of forming (step S4), the iron core piece region R to which the adhesives B are applied is punched to form the iron core piece W. In the process of laminating (step S5), the plurality of iron core pieces W are laminated while the iron core pieces W adjacent to each other are adhered by the adhesives B. In the process of applying (step S3), on at least one of the entire yoke portion 2 and all the teeth portions 3, the adhesives B are arranged at different radial distances from the central axis Ax of the iron core pieces W and are evenly arranged in the circumferential direction, and the regions N are disposed on the iron core piece W along the predetermined direction D. In the process of progressively feeding (step S1), the plurality of lifters 146 support the lower surface MS1 of the metal plate (magnetic steel sheet MS) in a manner that at least one of the lifters 146a passes through the region N. Accordingly, the adhesion of the adhesives B to the lifters 146 can be prevented.

In the manufacturing method of the laminated iron core 1 according to the embodiment, the adhesives B are arranged in the staggered manner in the circumferential direction in the process of applying (step S3). Accordingly, the decrease in the rigidity only in one direction can be further prevented.

In the manufacturing method of the laminated iron core 1 according to the embodiment, the adhesives B adjacent to each other along the laminating direction are arranged in a manner of overlapping each other in the plan view in the process of laminating (step S5). Accordingly, the decrease in the rigidity in only one direction in the laminated iron core 1 can be prevented.

In the manufacturing method of the laminated iron core 1 according to the embodiment, the adhesives B adjacent to each other along the laminating direction are arranged at positions different from each other in the plan view in the process of laminating (step S5). Accordingly, the decrease in the rigidity only in one direction in the laminated iron core 1 can be further prevented.

The progressive die machine (pressing device 130) according to the embodiment includes the upper die 150, the lower die 140, the plurality of lifters 146, and the applying unit 143. The upper die 150 and the lower die 140 press the band-shaped metal plate (magnetic steel sheet MS) fed progressively in the predetermined direction D, and then forms the iron core piece W including the annular yoke portion 2 and the plurality of teeth portions 3 projecting radially from the yoke portion 2. The plurality of lifters 146 are provided on the lower die 140 and support the lower surface MS1 of the metal plate (magnetic steel sheet MS) when the metal plate (magnetic steel sheet MS is fed progressively. The applying unit 143 is provided in the lower die 140 and applies the adhesive B to the lower surface MS1 of the metal plate (magnetic steel sheet MS). The applying unit 143 applies the adhesives B on the lower surface MS1 of the metal plate (magnetic steel sheet MS) such that on at least one of the entire yoke portion 2 and all the teeth portions 3, the adhesives B arranged at different radial distances from the central axis Ax of the iron core pieces W and evenly arranged in the circumferential direction, and the regions N on which the adhesives B are not applied are arranged along the predetermined direction D in the iron core piece W. At least one lifter 146a supports the lower surface MS1 of the metal plate (magnetic steel sheet MS) in a manner of passing through the regions N. Accordingly, the adhesion of the adhesives B to the lifters 146 can be prevented.

Further effects and modifications can be easily derived by those skilled in the art. Therefore, broader aspects of the invention are not limited to the specific details and representative embodiments shown and described above. Therefore, various changes may be made without departing from the spirit or scope of the general inventive concept defined by the appended claims and equivalents thereof.

What is claimed is:

1. A laminated iron core, comprising:
a plurality of iron core pieces which are laminated; and
adhesives that bond the iron core pieces adjacent to each other, wherein;
each of the iron core pieces includes an annular yoke portion and a plurality of teeth portions projecting radially from the yoke portion,
each of the adhesives is arranged at a different radial distance from a central axis of the iron core pieces and is evenly arranged in a circumferential direction of the iron core pieces on at least one of the entire yoke portion and the entire teeth portions, and
each of the iron core pieces has an adhesive unapplied region disposed along a predetermined direction such that the adhesives are prevented from being applied inside the adhesive unapplied region, and
wherein the adhesives comprise:
a first adhesive arranged on a first imaginary line extending from the central axis in a first radial direction, and
a second adhesive arranged on a second imaginary line extending from the central axis in a second radial direction different from the first radial direction,
wherein the first adhesive is arranged at a first distance from the central axis on the first imaginary line and outside the adhesive unapplied region,
a position at the first distance from the central axis on the second imaginary line is inside the adhesive unapplied region, and
the second adhesive is arranged at a second distance from the central axis on the second imaginary line, the second distance being set such that the second adhesive is arranged outside the adhesive unapplied region.

2. The laminated iron core according to claim 1, wherein the adhesives are arranged in a staggered manner in the circumferential direction.

3. The laminated iron core according to claim 1, wherein the adhesives adjacent to each other along a laminating direction are arranged to overlap with each other when viewed along the laminating direction.

4. The laminated iron core according to claim 1, wherein the adhesives adjacent to each other along a laminating direction are arranged at positions different from each other when viewed along the laminating direction.

5. The laminated iron core according to claim 1, wherein the adhesive unapplied region is a strip transverse to a radial direction of the iron core pieces.

6. A manufacturing method of a laminated iron core, comprising:
progressively feeding a metal plate in a predetermined direction while supporting a lower surface of the metal plate by a plurality of lifters;
applying adhesives to an iron core piece region of the lower surface of the metal plate, the iron core piece region corresponding to each of iron core pieces including an annular yoke portion and a plurality of teeth portions projecting radially from the yoke portion;
punching the iron core piece region to form each of the iron core pieces; and
laminating the plurality of iron core pieces while adhering the iron core pieces adjacent to each other with the adhesives, wherein
in an operation of applying the adhesives, on at least one of the entire yoke portion and the entire teeth portions, each of the adhesives is arranged at a different radial distance from a central axis of the iron core pieces and is evenly arranged in a circumferential direction of the iron core pieces, and a region where the adhesives are not applied is disposed on each of the iron core pieces along the predetermined direction and is configured to contact the lifters, and
in an operation of progressively feeding the metal plate, the lower surface of the metal plate is supported by the plurality of lifters to cause at least one of the lifters to pass through the region.

7. The manufacturing method of a laminated iron core according to claim 6, wherein in the operation of applying the adhesives, the adhesives are arranged in a staggered manner in the circumferential direction.

8. The manufacturing method of a laminated iron core according to claim 6, wherein in an operation of laminating the iron core pieces, the adhesives adjacent to each other along a laminating direction are arranged to overlap with each other when viewed along the laminating direction.

9. The manufacturing method of a laminated iron core according to claim 6, wherein in an operation of laminating the iron core pieces, the adhesives adjacent to each other along a laminating direction are arranged at positions different from each other when viewed along the laminating direction.

10. A progressive die machine, comprising:
- an upper die and a lower die configured to form each of iron core pieces including an annular yoke portion and a plurality of teeth portions protruding radially from the yoke portion by pressing a band-shaped metal plate fed progressively in a predetermined direction;
- a plurality of lifters provided on the lower die and configured to support a lower surface of the metal plate when the metal plate is fed progressively; and
- an applying unit provided in the lower die and configured to apply adhesives to the lower surface of the metal plate, wherein the applying unit applies the adhesives on the lower surface of the metal plate such that on at least one of the entire yoke portion and the entire teeth portions, each of the adhesives is arranged at a different radial distance from a central axis of the iron core pieces and is evenly arranged in a circumferential direction of the iron core pieces, and a region where the adhesives are not applied is disposed on each of the iron core pieces along the predetermined direction and is configured to contact the lifters, and at least one of the lifters supports the lower surface of the metal plate to pass through the region.

* * * * *